(No Model.)  4 Sheets—Sheet 1.

C. G. HAMPTON.
GRAIN DRILL.

No. 303,153.  Patented Aug. 5, 1884.

Witnesses,
Geo. H. Strong
J. H. Strong

Inventor,
C. G. Hampton
By
Dewey & Co.
Attorneys

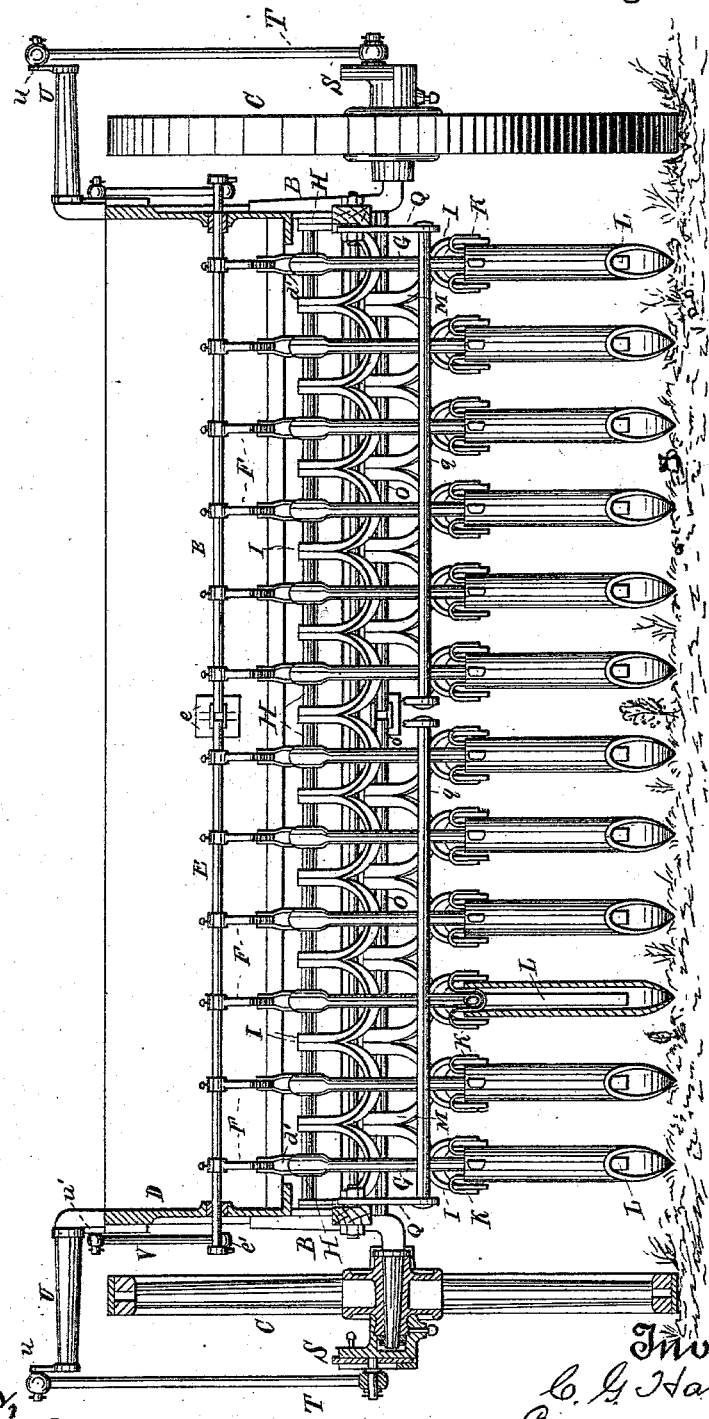

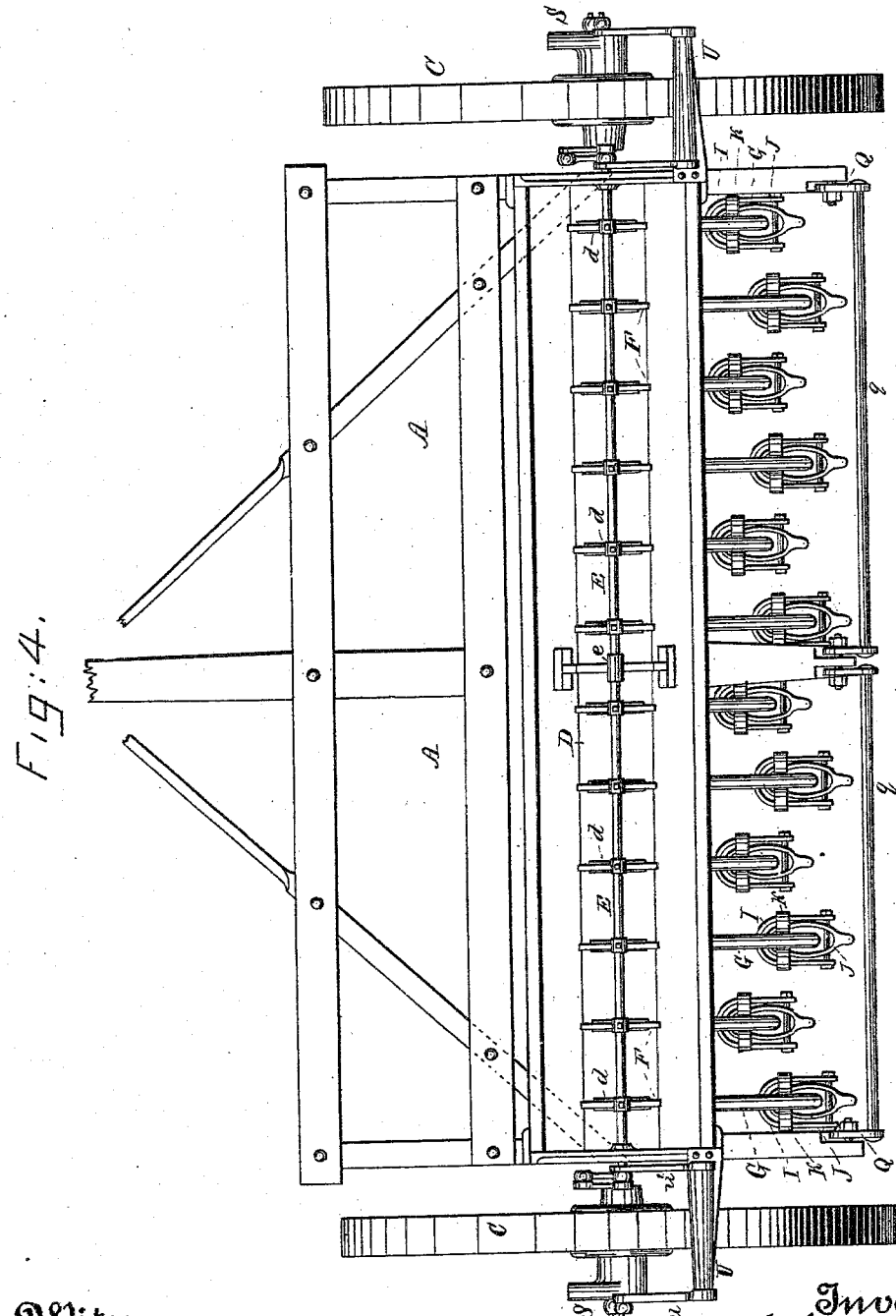

(No Model.)  C. G. HAMPTON.  4 Sheets—Sheet 4.
GRAIN DRILL.

No. 303,153.  Patented Aug. 5, 1884.

Witnesses,
Geo. H. Strong.
J. H. Rouse.

Inventor,
C. G. Hampton
By
Dewey & Co.
attorneys

UNITED STATES PATENT OFFICE.

CALVIN G. HAMPTON, OF TURLOCK, CALIFORNIA.

GRAIN-DRILLS.

SPECIFICATION forming part of Letters Patent No. 303,153, dated August 5, 1884.

Application filed January 17, 1884. (No model.)

*To all whom it may concern:*

Be it known that I, CALVIN G. HAMPTON, of Turlock, county of Stanislaus, and State of California, have invented Improvements in Grain-Drills; and I do hereby declare the following to be a full, clear, and exact description thereof.

My invention relates to that class of seeding implements or grain-drills in which the seed is conducted from a hopper or seed-box through an intermediate conveyer to the drill-tube; and my invention consists in novel means for feeding the seed from the hopper accurately and definitely, and in certain improvements in arranging and combining the various conveyers and drill-tubes, whereby all of the necessary adjustments and the yielding of the drills can be accomplished to the best advantage without disturbing the relation or communication of the parts.

It also consists in details of construction to effect the operation.

The object of my invention is to provide a grain-drill which can be easily handled, effective in operation, and not likely to get out of order or become disarranged in any of its parts while in use.

Figure 1:
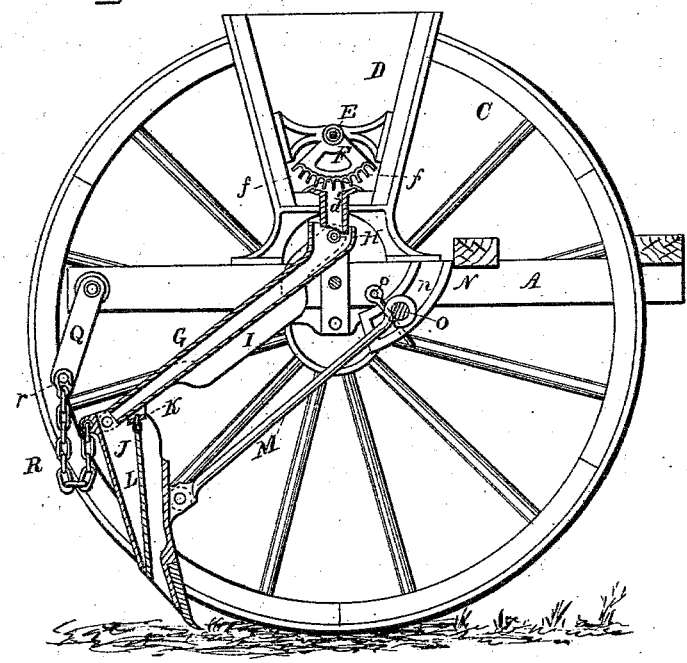
Figure 3:
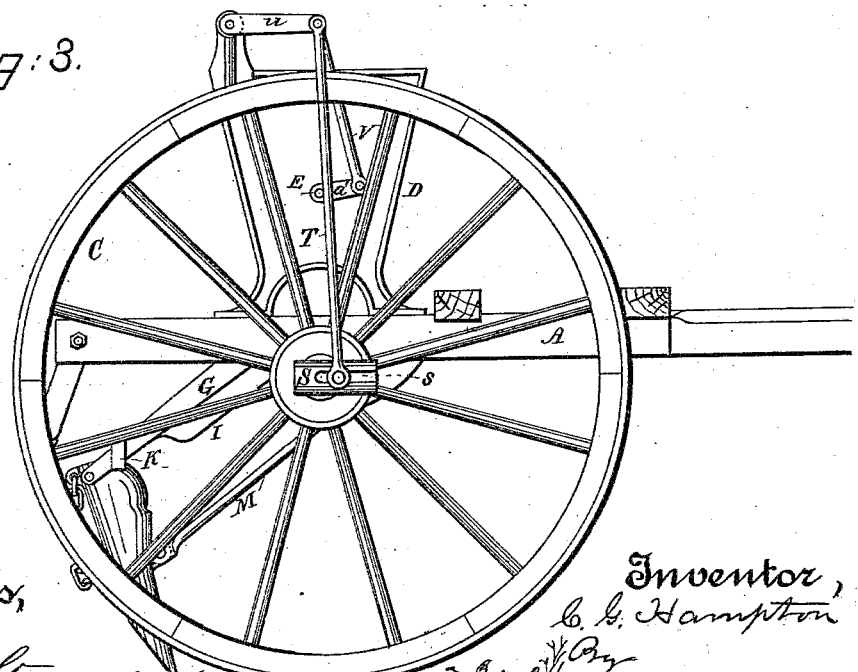
Figure 5:
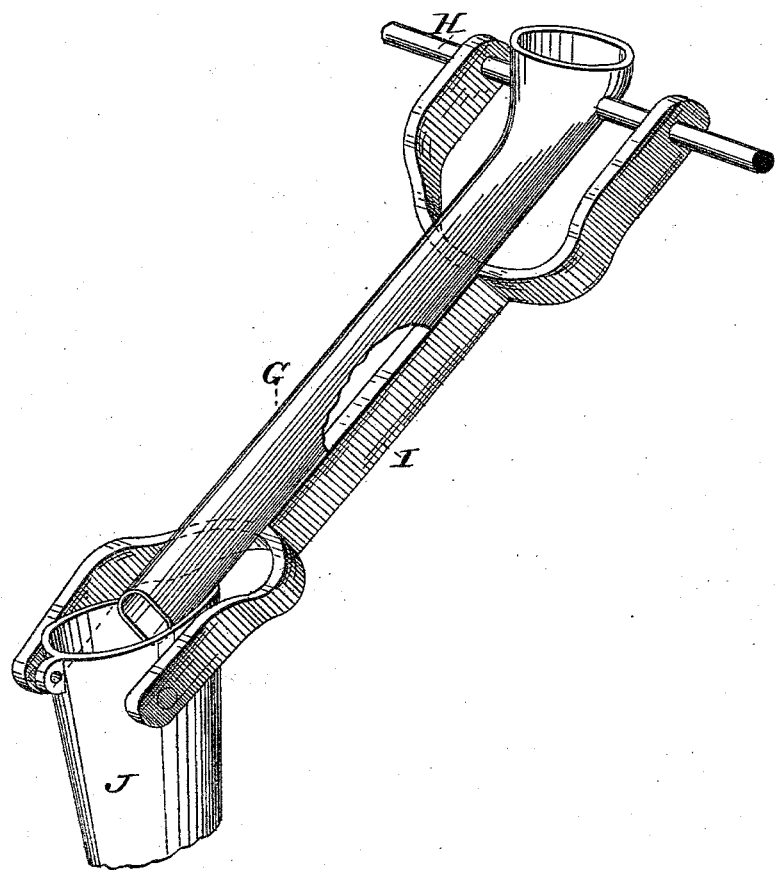

Referring to the accompanying drawings, Figure 1 is a sectional elevation of my grain-drill. Fig. 2 is a rear elevation of same, one of the wheels and drills being shown in section. Fig. 3 is a side elevation. Fig. 4 is a plan. Fig. 5 is a detail perspective view of one of the braces I, spouts G, and drills J.

A is the frame, B the axle, and C the wheels, of the device. Upon the frame, mounted transversely, is the seed box or hopper D, having slots or apertures $d$, made transversely at intervals in its bottom, Fig. 4. Through the hopper extends a shaft, E, mounted in its ends, and adapted to be oscillated in a manner I shall presently explain. Upon this shaft are secured quadrants or sectors F, which, in the oscillation of the shaft, play directly over the apertures $d$, and act as feeders therefor. These feed-sectors have fluted rims, forming a number of pockets, $f$, which render the feed accurate both in time and quantity. The shaft E, as shown in Fig. 2, is divided centrally, the adjacent ends being mounted in a box or bearing, $e$. The object of this is to practically divide the feed mechanism in two, so that one wheel may drive its own half independently. The feed-apertures $d$ are carried down a short distance in the form of small spouts $d'$, to make the proper connection with the backwardly-inclined spouts G, the upper ends of which are in communication with small spouts $d'$. Usually the spouts or conveyers G are made of some flexible material, in order to provide for the adjustment of the drills; but in my invention they are not flexible, and I employ other means to provide for the necessary play. The upper ends of the spouts are each pivoted on a transverse shaft, H, to which are also pivoted the forked upper ends, Figs. 2 and 5, of braces I, extending down under the spouts and secured to them, Figs. 1 and 5. The lower ends of these braces are also forked and embrace the upper ends of the drill-tubes J, Figs. 2 and 4, to which they are pivoted, Fig. 1, and with which the spouts G communicate. Now, it is obvious that in meeting a clod or other obstruction, any of the drills may give and rise on its pivot by reason of the braces being themselves pivoted, and this movement of the drill is not prevented by the spout discharging into its upper end, for this latter, being pivoted above, rises also.

Bolted to the lower forks of braces I are M-shaped irons K, passing over and into the upper end of drills J and down under the spouts G, as shown in Fig. 2 in that drill of said figure shown in section. To the center of these irons are loosely linked tongues L, extending down through the drill-tubes to the bottom, Figs. 1, 2. These are for the purpose of clearing the mouths of the drill-tubes when they get clogged up, and the object is attained by reason of the protrusion of its tongues. When a clod or obstruction is met, the first tendency of the drills is to swing back on their own pivots, in which case the tongues would not protrude; but if the obstruction could not be so avoided, and the drills would have to rise, as described, then the angle which they form with the spouts would approach a right angle, and the tongues, being hung forward of the angle, would be relatively lowered as the drills rose, thereby protruding below; but as this rising of the drills is not sufficiently certain with the arrangement thus far described, I use further means to insure this rise by preventing any independent movement on their own pivots, while allowing it in connection with their rising action, the tendency of the former calling into play the latter movement, whereby the protrusion of the tongues is rendered certain.

M are brace-rods, the upper ends of which are forked, Fig. 2, and are pivoted on a shaft, O, the ends of which are mounted in guides N, having slots $n$ made on the arc of a circle whose center is the shaft H, on which the braces I are pivoted, Fig. 1. This shaft O is held up at any desired position in the guides by means of pins $o$, Fig. 1. These pass through holes in the guides, which, for the purpose of obtaining a close adjustment, are preferably staggered—that is to say, placed out of line—so that more holes may be made in a given distance. The shaft O is centrally divided, and its adjacent ends mounted in a box, $o'$, by which means one half the drills may be adjusted independently of the other half. The lower ends of the rods M are pivoted to the forward side of the drills J at a point which renders them parallel to the spouts G above. The most obvious and primary purposes of these brace-rods is to strengthen the drills, and also to vary and adjust their inclination, which is done by raising or lowering the shaft O in its guides above and setting it by means of the pins; but their further purpose is to insure the extension of the tongues, as I have already indicated, when the drills meet an obstruction and rise over it. The drill in attempting to pass the obstruction cannot simply move back, because it is prevented by the rods M; but it can rise, though on two centers—namely, the upper pivots of the braces H and the rods M. The lower pivots of these remaining equidistant, and the tongue being suspended at a point between them and higher than the former, this point is brought down in line with the former as the angles formed by the drills with the braces and connecting-rods approach right angles by the rising of the drills, thus causing the tongues to protrude from the mouths of the drills, which clears them of wet earth, &c., with which they may have become clogged.

The object in guiding the upper ends of the brace-rods M on an arc is to preserve the distance of their pivot-points from those of the braces H, whereby the action remains the same whatever may be the adjustment of the rods to incline the drills.

Pivoted to the rear of the frame are arms or links Q, between which a rod, $q$, Fig. 2, extends, forming a handle. To this rod are secured chains R by means of hooks $r$. The chains are also connected with the rear top of the drills, Fig. 1. By raising this rod until it passes a vertical position above its center of motion the drills are all lifted up and held there while the machine is being taken from place to place. I prefer to divide the rod $q$ centrally, as shown in Figs. 2, 4, thus forming two handles, whereby one half the drills may be hung up independently of the other half.

The means I employ for operating the feed-sectors are as follows: Upon the hubs of the wheels are secured cranks S, having slots or grooves $s$ made in them, Fig. 3. With these cranks are connected rods T, the upper ends of which are connected to short cranks $u$ on shafts U, the other ends of which have cranks $u'$. With these latter cranks are connected pitman V, the lower ends of which are connected with cranks $e'$ on the ends of shaft E. Through this arrangement of cranks power is transmitted from and over the wheels to oscillate or rock shaft E with its feed-sectors. The slot or groove $s$ in the wheel-crank is for the purpose of adjusting the connecting-rods T closer to or farther from the center to decrease or increase the movement of the sectors, though I do not confine myself to this particular means for adjusting them.

The operation of my drill is as follows: The seed is placed in the hopper, and by the rocking of the sectors is feed accurately through the feed-apertures into spouts or conveyers G, by which it is connected to the drills and deposited suitably. The different conductors are always in communication with each other, with no liability to become disarranged, and all the necessary adjustments are provided for.

Having thus described my invention, what I claim as new, and desire to secure by Letters Patent, is—

1. In a grain-drill, the hopper or seed-box D, provided with transverse feed-openings $d$ in its bottom, in combination with the feed-sectors F and the means for oscillating them, consisting of the rocking shaft E, having cranks $e'$, the cranks S on the wheels, the connecting-rods T, adjustable on said cranks, the shafts U, having cranks $u$ $u'$, and the pitman V, all arranged and operating substantially as herein described.

2. In a grain-drill, a hopper or seed-box provided with discharge or feed openings in its bottom, in combination with the spouts or conveyers G, in communication with said openings, the braces I under said conveyers, and the shaft H on which said conveyers and braces are pivoted, and the drill-tubes J, pivoted to the lower ends of braces I, and in communication with the conveyers, substantially as herein described.

3. In a grain-drill, a hopper or seed-box having feed-openings in its bottom, the pivoted spouts or conveyers G in relation with said openings, and the pivoted braces I, in combination with the drill-tubes J, pivoted to the lower ends of said braces, and in relation with the conveyers, and the tongues L in the drill-tubes, loosely suspended from the conveyer or its brace at a point above the pivotal line of the drill-tube, substantially as herein described.

4. In a grain-drill, a hopper or seed-box having feed-openings in its bottom, the pivoted spouts or conveyers G, and the pivoted braces I, arranged as shown, in combination with the drill-tubes J, pivoted at their backs to the lower ends of the braces, and communicating with the conveyers, the irons K, bolted to the braces and curving down under the conveyers into the drill-tubes, and the tongues L, loosely suspended from said irons, and hanging down in the drill-tubes to their lower ends, substantially as herein described.

5. In a grain-drill, the spouts G and braces I, pivoted at their upper ends, and the drill-tubes J, pivoted to the lower ends of braces I, in combination with the brace-rods M, parallel to the spouts G, pivoted at their lower ends to the drill-tubes and at their upper ends to a shaft, O, said shaft being mounted in slotted guides N, the slots n of which are on the arc of a circle whose center is the pivot-line of spouts G and braces I, whereby the rods may be drawn up or let down to vary the inclination of the drill-tubes without interfering with their pivotal action, and a means for setting the shaft O at any point in its guides, substantially as herein described.

6. In a grain-drill, the pivoted spouts G, braces I, and drill-tubes J, arranged as shown and described, in combination with the pivoted brace-rods M, the curved and slotted guides N, with their pins o, and the centrally-divided or two-part shaft O, mounted in the guides, and to which the brace-rods M are pivoted, whereby the inclination of half the drills may be varied independently of the other half, substantially as herein described.

7. In a grain-drill, the pivoted spouts G and braces I, the drill-tubes J, pivoted to the lower ends of the braces, and the tongues L, loosely suspended within said tubes, as described, in combination with the brace-rods M, parallel to spouts G, and pivoted to the drill-tubes, the curved guides N, and the shaft O, mounted therein, and to which the brace-rods are pivoted, substantially as herein described.

In witness whereof I hereunto set my hand.

CALVIN G. HAMPTON.

Witnesses:
  C. D. COLE,
  J. H. BLOOD.